United States Patent
Mensah

(10) Patent No.: US 9,369,229 B2
(45) Date of Patent: Jun. 14, 2016

(54) COMMUNICATIONS DEVICE

(75) Inventor: Trevor Mensah, Weston (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 201 days.

(21) Appl. No.: 13/991,738

(22) PCT Filed: Oct. 21, 2011

(86) PCT No.: PCT/GB2011/001516
§ 371 (c)(1),
(2), (4) Date: Jun. 5, 2013

(87) PCT Pub. No.: WO2012/076833
PCT Pub. Date: Jun. 14, 2012

(65) Prior Publication Data
US 2013/0297965 A1    Nov. 7, 2013

(30) Foreign Application Priority Data
Dec. 7, 2010   (EP) .................................... 10252072

(51) Int. Cl.
*H04L 1/00*    (2006.01)
*H04L 12/24*   (2006.01)

(52) U.S. Cl.
CPC .............. *H04L 1/00* (2013.01); *H04L 41/0681* (2013.01); *H04L 41/18* (2013.01); *H04L 41/22* (2013.01); *H04L 41/5061* (2013.01)

(58) Field of Classification Search
CPC ..... H04L 12/2697; H04L 1/00; H04L 41/061; H04L 41/18; H04L 41/22; G06F 11/0748; G06F 11/0769
USPC ............................................... 714/26, 48, 57
See application file for complete search history.

(56) References Cited

U.S. PATENT DOCUMENTS

| 6,847,819 | B1* | 1/2005 | Sprigg et al. .................. 455/445 |
| 8,307,069 | B2* | 11/2012 | Savo ....................... H04L 43/12 702/186 |
| 8,589,741 | B2* | 11/2013 | Windell et al. ................. 714/46 |
| 8,626,898 | B2* | 1/2014 | Howcroft ....................... 709/224 |
| 8,644,813 | B1* | 2/2014 | Gailloux .............. H04W 24/08 455/115.1 |
| 8,949,671 | B2* | 2/2015 | Mukherjee .......... G06F 11/0718 714/26 |
| 2002/0087680 | A1* | 7/2002 | Cerami et al. ................ 709/224 |
| 2002/0184065 | A1* | 12/2002 | Menard .................. G06Q 30/06 709/224 |
| 2006/0233114 | A1* | 10/2006 | Alam .................... H04L 41/069 370/252 |
| 2006/0234698 | A1* | 10/2006 | Fok ........................ H04L 12/26 455/425 |
| 2006/0248407 | A1* | 11/2006 | Adams et al. .................. 714/43 |
| 2007/0036146 | A1* | 2/2007 | Adkins et al. ................ 370/352 |

(Continued)

OTHER PUBLICATIONS

International Search Report for PCT/GB2011/001516 mailed Dec. 12, 2011.

*Primary Examiner* — Loan L. T. Truong
(74) *Attorney, Agent, or Firm* — Nixon & Vanderhye P.C.

(57) ABSTRACT

A diagnostic processor (24) is installed in a router (2) on the user side of a network termination. This processor can be downloaded from the network and can in turn be downloaded to user terminals in a local network. On detection of a fault, the processor retrieves data from a store of fault rectification instructions, for display in a form appropriate to a user terminal, giving the user instruction appropriate to the fault condition detected and the type of router being used. This allows the user to rectify the problem without recourse to online or telephone helplines, which may be unavailable because of the prevailing fault condition.

8 Claims, 5 Drawing Sheets

(56) References Cited

U.S. PATENT DOCUMENTS

| | | | |
|---|---|---|---|
| 2007/0107041 A1* | 5/2007 | Kayashima et al. | 726/1 |
| 2007/0283005 A1* | 12/2007 | Beliles et al. | 709/224 |
| 2008/0034114 A1* | 2/2008 | Ducey et al. | 709/238 |
| 2008/0195614 A1 | 8/2008 | Lutz et al. | |
| 2008/0313669 A1* | 12/2008 | Acharya et al. | 725/34 |
| 2009/0080408 A1* | 3/2009 | Natoli et al. | 370/351 |
| 2009/0164849 A1* | 6/2009 | Sugaya | 714/38 |
| 2009/0195655 A1* | 8/2009 | Pandey | 348/158 |
| 2010/0071024 A1* | 3/2010 | Eyada | 726/1 |
| 2010/0121951 A1* | 5/2010 | Trebing et al. | 709/224 |
| 2010/0197238 A1* | 8/2010 | Pathuri | H04L 41/0609 455/67.11 |
| 2011/0125925 A1* | 5/2011 | Bouthemy et al. | 709/250 |
| 2011/0126095 A1* | 5/2011 | Brock et al. | 715/702 |
| 2011/0141921 A1* | 6/2011 | Reese et al. | 370/252 |
| 2011/0149720 A1* | 6/2011 | Phuah | H04L 12/2697 370/216 |

* cited by examiner

COMMUNICATIONS DEVICE

This application is the U.S. national phase of International Application No. PCT/GB2011/001516 filed 21 Oct. 2011 which designated the U.S. and claims priority to EP 10252072.3 filed 7 Dec. 2010, the entire contents of each of which are hereby incorporated by reference.

BACKGROUND AND SUMMARY

This invention relates to communications devices, and is of particular applicability to routers of the kind used in a domestic or small business installation to connect one or more user terminals to an external data network and to each other. A typical router (also known as a "hub") includes a modem to provide an interface with the external network, communications connections to communicate with one or more user terminals, and a switching means to route data traffic between the various connections. The communications connections may include either or both of wired connections, for example Ethernet, and wireless, for example "WiFi" or IEEE 802.11.

Many routers with a wireless capability have the ability to partition their operation so that any terminal within wireless range can be granted limited "public" access, but certain authorised user terminals are given greater access privileges—for example allowing them access to data stored on another terminal, or simply giving precedence on bandwidth allocation.

Computers and communications equipment are designed to be as simple to operate as possible but the underlying design can be extremely complex.

A typical architecture is illustrated in FIG. 1. This is a typical FTTC (Fibre to the cabinet) connection, where a telephone line (47) is directly connected to a VDSL (very high bitrate digital subscriber loop) modem [modulator/demodulator] (6). The modem input side is plugged into the phone line and the output port to a local area network (LAN) through an ethernet connection 43. The modem 6 establishes an 'audio carrier' connection over the copper telephone line to a DSLAM [modulator/demodulator] (7) which is connected via fibre optic to the backbone which routes the Internet 8. The DSLAM 7 may be co-located with the exchange 48, or it may be in a cabinet at some intermediate location nearer the customer premises where a fibre connection terminates.

The LAN port connector of the modem 6 is plugged into a router 2. Finally customers establish connection between terminal devices (3, 13 etc) to the internet 8 either by wireless connection to the hub 2, or by plugging a further connector into a spare LAN port on the hub 2.

Management of the various user devices remotely—from the service or network provider, is used for several purposes. The Broadband and Telephone lines can be managed remotely using back office systems to check telephone lines for power, signal noise, speed, etc. and 'broadband up' status. They can also initiate a re-train of the modem at higher frequencies if the signal to noise quality changes, etc, and also change broadband speed profiles.

The broadband link to the Modem can be managed remotely by the network operator, downloading management and software upgrades. The customer gateway can also be managed remotely by the service provider, including operation of wireless passwords, parental controls, etc.

The Home Hub can also be managed by the service provider remotely, including getting/setting data and configuration, as well as initiating software upgrades and the sending of a periodic report from hub to remote management platform of recent usage data.

Individual devices such as a so-called "set top box", which converts digital signals into a format usable by a conventional analogue television set, can be managed remotely to control the television service offered, including daily sending of previous day's 'history' data. The term "set top box" (STB) is now somewhat of a misnomer as the design of most modern flat screen television sets precludes placing any such device on top of them and the STB is normally placed beneath the television set itself.

The majority of domestic users have little understanding of how to investigate or correct any apparent faults which may develop in such a system. In many cases the actual solution may be relatively straightforward, but diagnosis is difficult or impossible without guidance. Because of the complexity of the equipment, users are wary of trying to rectify the situation for fear of making matters worse.

A further difficulty is that many routers have a very limited user interface, often consisting only of a few indicator lights and one or two switches. Moreover, the user is likely to be using one of the terminals connected to the router, rather than the router itself, and may not realise that it is some item of equipment other than the one they are operating directly which requires attention.

Many network and equipment providers offer helplines to provide assistance in such circumstances. These may be "online" web-based information, or a telephone helpline. In some online systems, the client device establishes a route out to the remote [server] management systems, and the server can then pull diagnostic information 'on demand' and can 'set' and 'get' information to and from the device to fix issues or change configuration settings. Such systems are described for example in United States Patent Applications US2002/087680 (Cerami) and US2007/036146 (Adkins). However, such online systems cannot be used if the problem relates to connection to the Internet, as they require the end point device to be correctly configured, wired and powered, and then directly connected to the remote management platform in order to help diagnose issues causing service problems—in other words there must be a well connected direct network path between the 'client cpe' and the 'device management platform (server)' for online support to work. If the problem is that there is no such path, online support cannot be used. In short, "online help" is not useful if the problem is how to restore an online connection.

If there is no 'route' back to the remote management server due to network or telephone line issues, there is also no way for a device to 'broadcast' its failure status to any other device which could help the customer to solve the problem or directly identify the source of the fault. The user could telephone a help desk or use a computer-based application 'wizard' to guide the customer manually through all the wiring, power, networking, access passwords, etc to get the service working and operational again, but this is very time consuming and frustrating for the customer.

Telephone helplines are more accessible as they do not rely on the internet connection, but they are expensive to operate; a cost which is either carried as an overhead by the supplier or recouped from the user by charging premium rates, which are unpopular with users. Where connection is available, facilities exists which allow the helpline operator to take remote control of the user's computer to rectify the problem. However, many users are understandably reluctant to grant remote access to their computers.

In many circumstances the helpline operator has no access to the user's installation, in particular if the connection to the network has been lost, and therefore cannot directly diagnose the problem. He can only talk the user through the steps he must take himself to make a diagnosis. Furthermore, some fault conditions involve failure of the telephone connection as well as the Internet, making even this approach impossible.

Consider for example the following three fault scenarios.

In the first scenario the user has experienced complete loss of Internet and telephone service. This could occur, for example, if the telephone line or power is unplugged from the modem, terminating the internet connection. The network operator cannot see any health indicators of the modem or the service and cannot help the customer automatically, and there is no way to tell the customer what has gone wrong.

In the second scenario there is loss of Internet, but not telephony. This can occur if the ethernet cable or power connecting the VDSL modem to the Home hub is unplugged from the home gateway. In this scenario the network operator can detect the telephone line is operational and the broadband service is 'up' but cannot see that the gateway is operational. Unless the network operators actively inform service providers when the status of a customer's LAN port changes in the customer home (goes up/down indicating the wifi hub has been plugged/unplugged), the service provider (SP) has no way of knowing the line status so that it can inform the customer where the fault is.

In the third scenario, the customer is experiencing a slow speed (low bandwidth) on his connection. This can be caused because of congestion, but can also be caused by the customer having plugged the telephone line (incorrectly) into the wrong connection on the hub, as many such hubs are fitted with separate connections to accommodate different legacy systems. In particular the user may have connected to a legacy copper system (e.g. ADSL2) when a faster VDSL2 connection is available. The service provider cannot detect this.

The above scenarios illustrate the failings of a pure client/server model for diagnosis or troubleshooting of customer home issues. The traditional models cannot help the customer even when the devices in the local network can individually diagnose their own faults, but cannot transmit those fault codes back to the management systems because of loss of connection. In these cases it is nevertheless necessary to help the customer to pin-point issues quickly and efficiently, even if those devices have no way to let the customer know what is happening (i.e. no display screen or indicator lights). The present invention is directed to making fault diagnosis and rectification easier for the user to achieve without external assistance.

The present invention provides a diagnostic processor installed in a communications device for connection to the user side of a network termination, the diagnostic processor having a fault detection unit to detect one or more fault conditions on the user side of the network termination, a fault diagnosis unit responsive to the detection of a fault by identifying a cause for said fault conditions, a store of fault rectification instructions, the diagnosis unit being arranged to retrieve a fault rectification instruction from the store appropriate to the identified cause, and a transmitter to transmit the retrieved fault rectification instructions to a user interface.

In another aspect, the invention provides a method of providing fault rectification instructions to a user terminal in response to detection of a fault condition, in which on detection of a fault condition by a communications device on the user side of a network termination, a fault rectification instruction appropriate to the identified fault is retrieved from a store on the user side and transmitted to a user interface.

The destination terminal is preferably a user terminal connected to the router through a local area network, either wireless or fixed. This may be done in addition to the transmission of data relating to a fault to a remote server operated by the service provider over the data network connection, if such connection is available.

In one preferred arrangement, the instructions are sent to a user terminal in response to a request from the terminal for such instructions. Alternatively, they may be sent to any or all of the terminals currently connected to the router. Different instructions, or instructions in different formats, may be sent to different terminals dependent on the type of terminal, or on their access privileges.

This invention provides a process by which failure conditions can be propagated in an IP broadcast message forward into the home LAN environment (e.g. a Telephone line unplugged/plugged event) as well as conventional backward propagation to the network. Any device within the home environment can listen for broadcast messages and use them to build up a correct picture of what is going on. This allows devices with a screen, audio output, or other means to inform the customer, to help the customer to solve the fault or intelligently re-configure the network connection onto a failover network such as temporary use of another connection (e.g. automatic failover for the purposes of fault detection).

Several user devices may each be configured so as to be capable of accessing these additional broadcast messages. Security provisions may be included to allow devices with appropriate permissions to access encrypted private propagation messages and interrogate date models for 'types of device' like gateways, set top boxes or pc's, (without making the information available to open access devices which may also be connected to the same wireless hub) allowing a 'network' mesh to occur where all secure devices are meshed together and can share access permissions.

Providing the rectification instructions to the user terminal allows much more comprehensive, and comprehensible, information to be made available to the user than would be possible on the limited user interface provided on the router itself. It can also alert the user to a problem whilst he is still at the terminal, even if the router is in another room.

In one preferred arrangement, the diagnostic processor installed in the router is arranged to be downloadable to one or more user terminals. This reduces the traffic between the terminal and the router as only the initial fault condition needs to be reported to the terminals by the router. It also allows a terminal to perform a diagnosis even if the problem lies in the router itself, or the connection between the terminal and the router.

The rectification instructions provided to a user would typically take the form of a step-by-step troubleshooting guide, tailored to the nature of the detected fault. For example, if the external connection between the router and the network has been lost, the user would first be instructed to check whether the network cable is plugged into the router. This can include an illustration of a router of the same type (which is readily identifiable as the instruction is generated by the router itself), showing where the connection socket is to be found and how to plug in the cable. The instructions can be provided to the user in a form suitable to the terminal in question, for example an internet telephone could be provided with audio instructions, whilst a laptop computer could be provided with audio-visual instructions.

BRIEF DESCRIPTION OF THE DRAWINGS

An embodiment of the invention will now be discussed with reference to the drawings, in which.

DETAILED DESCRIPTION OF PRESENT EXAMPLE EMBODIMENTS

Figure 1:
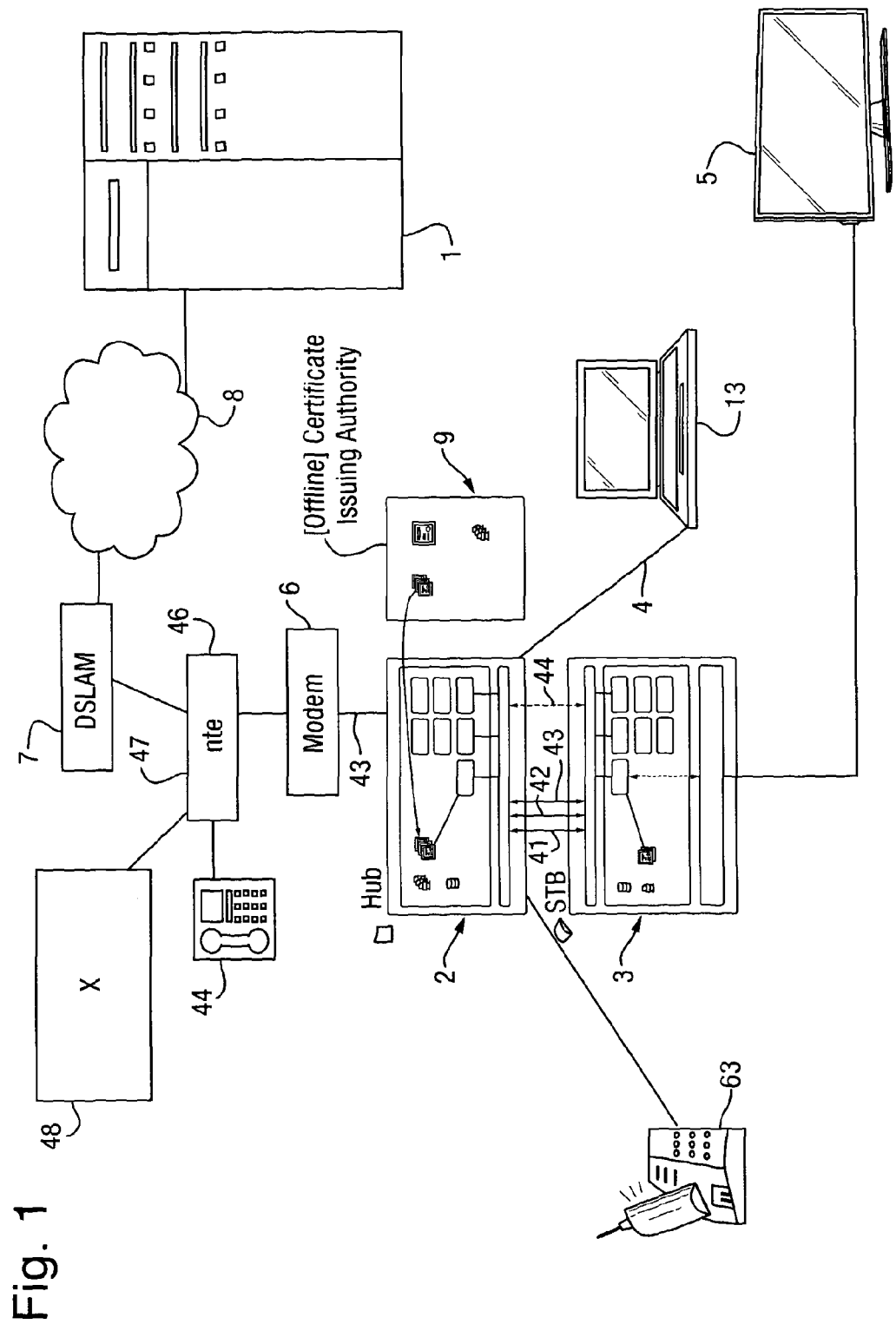
FIG. 1 is a schematic general depiction of a router and a number of devices cooperating therewith according to the invention

FIG. 1 depicts a service provider's service platform 1 which provides various downloadable material for transmission to user terminals either on request ("pull") or automatically ("push"). A router 2 or "hub" provides packet switching facilities for a user's local area network (LAN) providing connections between various user devices such as a computer 13, VoIP telephone 63 and a video downloading device 3 for playing video content through a television set 5. The hub 2 also provides a connection 43 to a modem 6 connected to an external network connection 46.

The interface 4 between the router 2 and the various user devices 3, 13, 63 may use wired connections, ("Ethernet"), or wireless (e.g. WiFi—IEEE 802.11), or the relevant functions may be integrated into the router device 3 itself through an internal interface.

The network connection or "network termination equipment" (NTE) 46 provides an interface between the user's own equipment and that of the network operator. The NTE may also provide connection for a conventional telephone 44 to the conventional switched telephone network 48. Data to and from the router 3 is directed by a digital subscriber line access multiplexer (DSLAM) 7 which connects the user termination 46 to the Internet 8. As already discussed, the DSLAM 7 may be co-located with the conventional exchange 48, or it may be in a cabinet at some intermediate location nearer the customer premises, at the termination of a fibre connection from the exchange.

FIG. 1 also depicts a "digital certificate" 9 which is exchanged between the service platform 1 and router 2 by way of the Internet 8 for authentication purposes.

Figure 2:
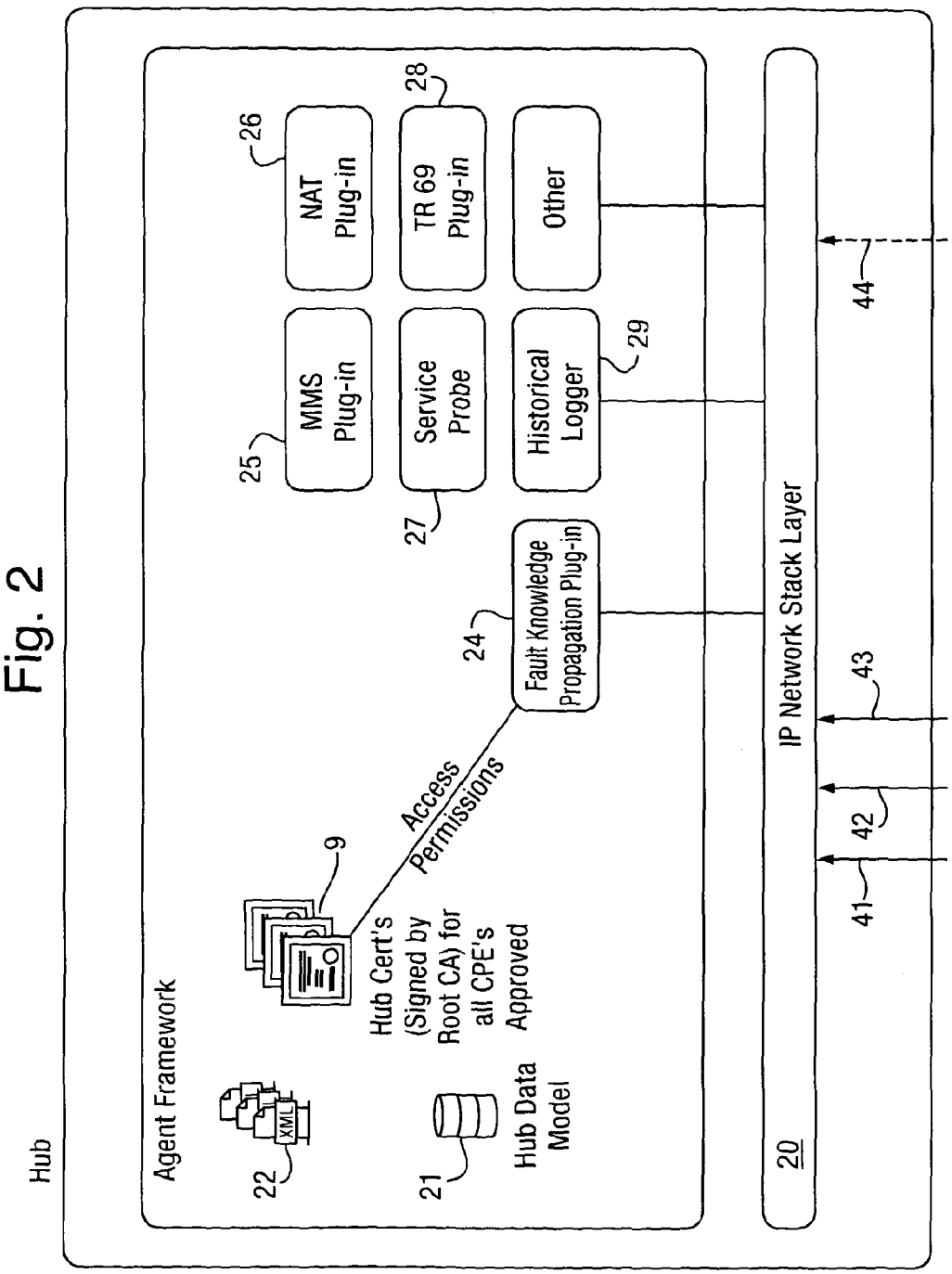
FIG. 2 is a more detailed schematic depiction of the router depicting the functional elements which co-operate to perform the invention

FIG. 2 depicts the router 2 in more detail. The router comprises a number of functional elements 24, 25, 26, 27, 28, 29 typically embodied in software. These may have been pre-programmed, downloaded as plug-ins from the external network 8, or downloaded from a user device over the local network 4 through a network stack 20. For present purposes the functional element of principal interest is a fault knowledge propagation plug-in 24 downloaded from the network operator's platform 1. This plug-in 24 has the capability to detect one or more fault conditions and to retrieve, from a store of information data files 22, a suitable set of instructions for rectification of such conditions.

Figure 3:
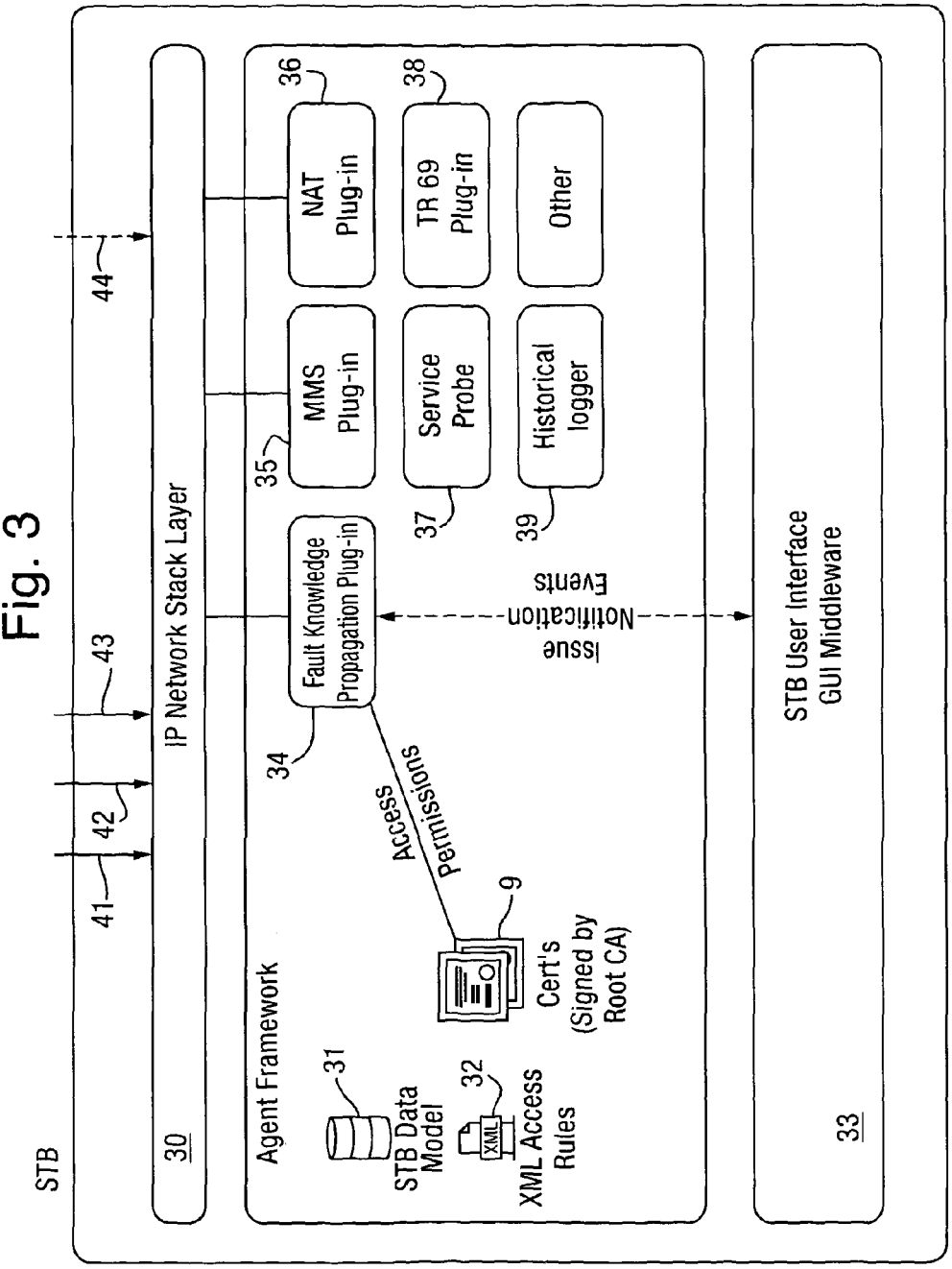
FIG. 3 is a more detailed schematic depiction of a user terminal depicting the functional elements which co-operate to perform the invention

FIG. 3 depicts one of the user terminals in more detail. It is embodied as a set top box, but other terminals could be configured similarly. The set top box 3 also comprises a number of functional elements 34, 35, 36, 37, 38, 39 typically embodied in software, which mirror the functions in the router 2. These are plug-ins downloaded from the router 2 over the interface 4 through a network stack 30. These plug-ins are configured according to the data model 31 to generate information in a form suitable for a user interface forming part of, or associated with, the terminal—in this case a TV set 5 connected to the set top box 3 through a user interface 33. For present purposes the functional element of principal interest is a fault knowledge propagation plug-in 34 downloaded from the network operator's platform 1. This plug-in is configured to display data in a format suitable for the user interface, in this case a TV screen.

Figure 4:
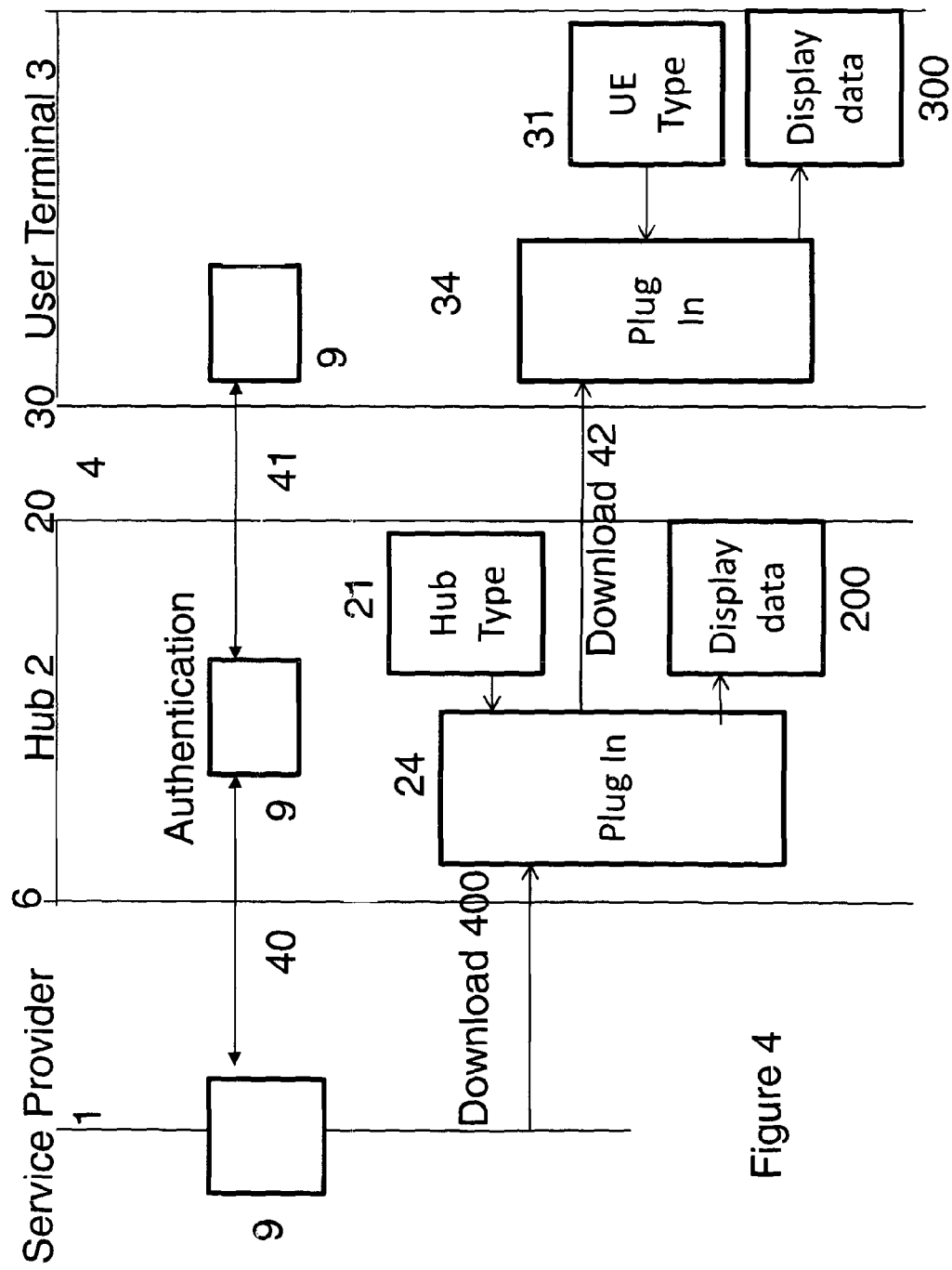
FIG. 4 is a data flow diagram depicting the information passing between the various elements of FIGS. 2 and 3 on installation of the process.

The installation of the plug-in process will now be described, with reference to FIG. 4. On request from a user, or as part of a routine service upgrade, or when the service provider 1 recognises the presence of a new user hub (router) 2 to the network 6, the service provider 1 instigates a download 400 of the software 24 required to perform the process of the invention. The plug-in may control the hub 2 to act autonomously, or it may also download (42) further plug-in software 34 to one or more user devices such as a set top box 3. The plug-ins 24, 34 are arranged such that, on download, they retrieve data 21, 31 identifying the type of equipment 2, 3 on which they are installed, such that the plug-ins 24, 34 can be configured to operate in conformance with that equipment. The plug-in 34 in the user terminal 3 generates a library 32 of display data for subsequent use. The plug-in in the hub similarly generates a library 22 of data relating to the various fault conditions.

Figure 5:
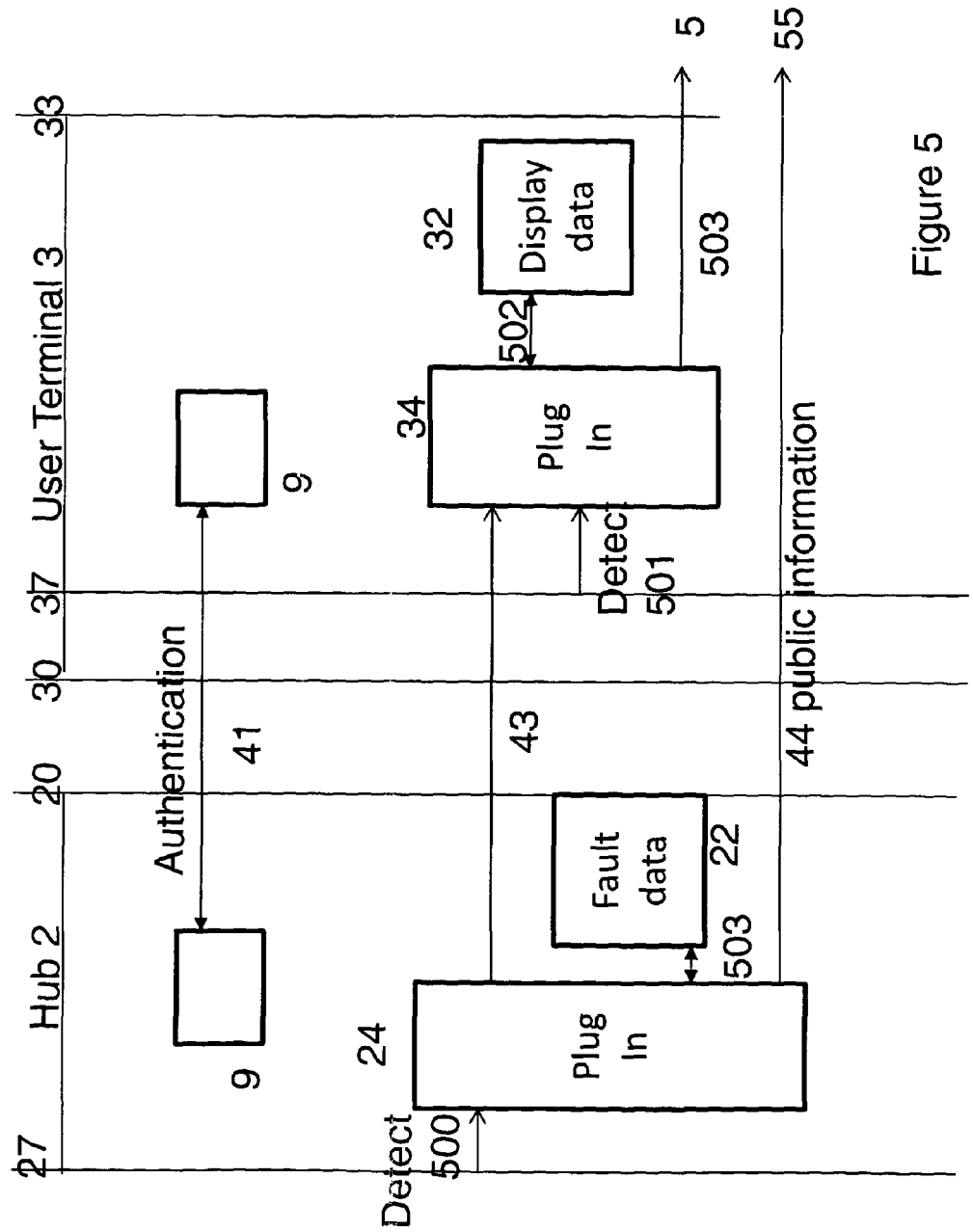
FIG. 5 is a data flow diagram depicting the information passing between the various elements of FIGS. 2 and 3 on detection of a fault condition.

The operation of the plug-in processes 24, 34 will now be described, with reference to FIG. 5. On detection of a fault or error condition, such as loss of connection to the network 8, the component 27 detecting the fault alerts the fault propagation system 24 which retrieves a data set from the files 22 and transmits the data across the interface 4 (step 43) to one or more user terminals 3 to which it is connected. The format of the data is configured to be suitable for the type of terminal involved, thus a set top box 3 will be sent data suitable for display on a TV screen 5, whilst an internet telephone 63 would have data transmitted in audio form, or plain text suitable for display on a display panel if the telephone has one.

The plug-in 34 in the user device 3 will retrieve the appropriate display data (step 502) according to the fault condition reported and the programming in the plug-in 34, and display it (step 503) on the user display 5. Where a visual display is available, the output 503 may consist of text stating what the problem is, accompanied by a diagram depicting the equipment 2 in question, and the controls or connection on that equipment which require attention. As the message is generated by the equipment 2 itself, and retrieved from its own data store 22, such a diagram can be made specific to the equipment type, avoiding difficulties which may be caused by generic diagrams which do not closely resemble the actual model in use.

The instructions may involve one or more diagnostic steps for the user to perform, or may be a simple instruction such as to reconnect a disconnected plug.

To ensure that data is only exchanged with authorised user terminals (for example, to exclude terminals which may be connected to the router on unsecured public "open access" terms) authentication data 9 is exchanged across the local area network connection 4 between the fault propagation plug-ins 24, 34, as depicted by the data flows 40, 41 in the Figures. Provided the authentication requirements are satisfied, notification data 43 can then be transmitted. More limited information 44 may be made available by the hub 2 to terminals connected to it, but which do not have authentication. Such information may simply inform a user 55 that the connection is no longer available, or give instructions as to how to find another connection.

The plug-in 34 in the user terminal 3 may also have provision for autonomous diagnosis, and display of proposed solutions, in circumstances where the connection 4 with the router 2 itself has been lost. Such plug-ins are downloaded from the router on installation, ready for activation in the event of subsequent loss of contact. Such conditions may include disconnection of an Ethernet connection, loss of wireless connectivity (for example through moving out of range), or a power failure of the router (for example because it has been inadvertently disconnected from a power supply). These are detected by some component 37 in the user device 3 and reported directly to the plug in 34.

For more complex problems, provided the external connection 8 to the service provider 1 is still present, diagnostic data may also be sent to the service provider 1. In the absence of such connection, communication with the service provider may still be possible if one of the user devices can connect to a public network in a second communications mode independent of the internet connection 6, for example using the cellular packet messaging system (GPRS).

What is claimed is:

1. A communications router device comprising:
   a transmitter;
   a store configured to store data corresponding to a fault rectification instruction; and
   a computer processor, configured to execute software to implement a diagnostic processor installed in the communications router device, the diagnostic processor being at least configured to:
   detect one or more fault conditions on a user side of a network termination,
   responsive to the detection of a fault, identify a cause for said fault conditions,
   retrieve the fault rectification instruction from the store appropriate to the identified cause, and
   propagate failure condition reports and the fault rectification instruction retrieved from the store in an IP broadcast message by way of the transmitter to a user interface;
   wherein processes installed in the router device are arranged to be downloaded to one or more user terminals.

2. A video download device, comprising:
   a transmitter;
   a store configured to store data corresponding to a fault rectification instruction; and
   a computer processor, configured to execute software to implement a diagnostic processor installed in the video download device, the diagnostic processor being at least configured to:
   detect one or more fault conditions on a user side of a network termination,
   responsive to the detection of a fault, identify a cause for said fault conditions,
   retrieve the fault rectification instruction from the store appropriate to the identified cause, and
   download the fault rectification instruction retrieved from the store by way of the transmitter to a user interface.

3. A router device comprising:
   storage memory;
   a computer processor for executing software to implement a diagnostic processor installed in the router device for connection to a user side of a network termination, the diagnostic processor being at least configured to:
   detect one or more fault conditions on the user side of the network termination,
   responsive to the detection of a fault, identify a cause for said fault conditions,
   retrieve a fault rectification instruction from the storage memory appropriate to the identified cause, and
   transmit, via a transmitter, the retrieved fault rectification instructions to a user interface,
   wherein the diagnostic processor is configured as software downloadable from a service provision platform.

4. A router device comprising: a computer processor and storage memory, the router device being configured to at least:
   receive plug-in software from a remote source, wherein the plug-in software upon execution by the computer processor configures the router device to at least:
   detect of one or more fault conditions;
   identify a cause for said one or more fault conditions;
   retrieve a fault rectification instruction from the storage memory appropriate to the identified cause; and
   transmit the retrieved fault rectification instructions to a user device; and
   download the received plug-in software to the user device.

5. The router device of claim 4, wherein the plug-in software upon execution by the computer processor controls the router device to act autonomously.

6. The router device of claim 4, wherein the plug-in software upon execution by the computer processor causes the router device to download further plug-in software received by the router device to the user device.

7. The router device of claim 4, wherein the user device is a video download device.

8. The router device of claim 1, wherein the diagnostic processor causes the router device to operate autonomously.

* * * * *